United States Patent
Corley et al.

(10) Patent No.: US 7,590,056 B2
(45) Date of Patent: Sep. 15, 2009

(54) PROCESSOR CONFIGURED FOR EFFICIENT PROCESSING OF SINGLE-CELL PROTOCOL DATA UNITS

(75) Inventors: Robert A. Corley, Cedar Park, TX (US); Robert H. Utley, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 1143 days.

(21) Appl. No.: 10/630,961

(22) Filed: Jul. 30, 2003

(65) Prior Publication Data
US 2005/0025154 A1   Feb. 3, 2005

(51) Int. Cl.
*G08C 15/00*   (2006.01)
(52) U.S. Cl. .................. 370/229; 370/463
(58) Field of Classification Search ............ 370/412, 370/395.1, 474, 229, 463
See application file for complete search history.

(56) References Cited

U.S. PATENT DOCUMENTS

| | | | | |
|---|---|---|---|---|
| 5,278,834 A | * | 1/1994 | Mazzola | 370/469 |
| 5,499,348 A | * | 3/1996 | Araki et al. | 712/207 |
| 5,640,399 A | * | 6/1997 | Rostoker et al. | 370/392 |
| 6,373,846 B1 | * | 4/2002 | Daniel et al. | 370/395.65 |
| 7,127,547 B2 | * | 10/2006 | Utley | 711/5 |

OTHER PUBLICATIONS

Hamacher, V. Carl, Vranesic, G. Zvonko, Zaky, G. Safwat, "Computer Organization", 1984, McGraw-Hill Book Company, Second Edition, p. 6.*

* cited by examiner

*Primary Examiner*—Seema S Rao
*Assistant Examiner*—Mon Cheri S Davenport
(74) *Attorney, Agent, or Firm*—Ryan, Mason & Lewis, LLP

(57) ABSTRACT

A processor includes controller circuitry configurable to determine for a given packet or other protocol data unit (PDU) received by the processor whether the given PDU is a single-cell PDU. If the given PDU is a single-cell PDU, information characterizing the given PDU is stored in first memory circuitry internal to the processor, without utilizing a linked list data structure. If the given PDU is not a single-cell PDU, information characterizing the PDU is stored in second memory circuitry external to the processor, utilizing a linked list data structure. The processor may be configured as a network processor integrated circuit to provide an interface between a network and a switch fabric in a router or switch.

12 Claims, 3 Drawing Sheets

PROCESSOR CONFIGURED FOR EFFICIENT PROCESSING OF SINGLE-CELL PROTOCOL DATA UNITS

FIELD OF THE INVENTION

The present invention relates generally to data communication devices and systems, and more particularly to network processors or other types of processors utilizable in conjunction with processing operations, such as routing or switching, performed on packets or other protocol data units (PDUs).

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

Packets in the routing and switching context are also commonly referred to as PDUs, and are typically variable in size. However, a switch fabric is often configured to process data only in fixed-size units, commonly referred to as cells. A given PDU received at an ingress line card of a router or switch is therefore processed, under the control of a network processor, to separate it into cells suitable for processing in the switch fabric.

In order to keep track of which cells are associated with which PDUs, a linked list approach is typically used in which head and tail pointers are stored for each PDU being processed. The head pointer identifies in a data buffer the particular block that stores a first cell of the PDU. Similarly, the tail pointer identifies in the data buffer the particular block that stores a final cell of the PDU. The data buffer blocks are typically linked such that an entire PDU as stored in the data buffer is identifiable using only the head and tail pointers.

It is often the case that a given PDU may be of a sufficiently small size that it can be processed in its entirety as a single cell. Such PDUs are referred to herein as "single-cell PDUs."

Conventional network processors generally process single-cell PDUs using the same linked list approach described above in the context of multiple-cell PDUs. In the case of a single-cell PDU, its head pointer and tail pointer both identify the same block in the data buffer. This leads to a number of significant problems relating to memory access. For example, when handling a large number of single-cell PDUs, the number of required linked list read and write operations is substantially increased, which degrades the overall throughput performance of the network processor. In addition, when a memory external to the network processor is utilized to maintain the linked list, an increase in the number of single-cell PDUs increases the latency associated with accessing the external memory, due to limitations in the available bus bandwidth. Generally, the ratio of linked list memory access cycles to data buffer memory access cycles increases substantially as the number of single-cell PDUs being processed increases, thereby degrading network processor performance. As a result, most conventional network processors have difficulty handling small PDUs at a specified line rate.

Accordingly, a need exists for a network processor or other type of processor that is capable of efficiently processing single-cell PDUs, without the above-noted problems associated with conventional techniques.

SUMMARY OF THE INVENTION

The invention provides improved techniques for processing single-cell PDUs in a network processor or other type of processor, in a manner that substantially reduces the number of memory accesses associated with linked list maintenance.

In accordance with one aspect of the invention, a network processor or other type of processor includes controller circuitry configurable to determine for a given packet or other PDU received by the processor whether the given PDU is a single-cell PDU. If the given PDU is a single-cell PDU, information characterizing the given PDU is stored in first memory circuitry internal to the processor. If the given PDU is not a single-cell PDU, information characterizing the PDU is stored in second memory circuitry external to the processor.

The information characterizing the given PDU may comprise one or more block descriptors, each associated with a particular data block of the given PDU.

In an illustrative embodiment, the information characterizing the single-cell PDU is stored in the first memory circuitry without requiring utilization of a linked list data structure, while the information characterizing the multi-cell PDU is stored in the second memory circuitry utilizing a linked list data structure.

The processor may be configured as a network processor integrated circuit to provide an interface between a network and a switch fabric in a router or switch.

Advantageously, the techniques of the invention in the illustrative embodiment process received PDUs in a manner that avoids application of a memory-intensive linked list maintenance approach to single-cell PDUs, thereby overcoming the above-identified problems associated with conventional linked list maintenance. As a result, processor performance and throughput are considerably improved.

DETAILED DESCRIPTION OF THE INVENTION

The invention will be illustrated herein in conjunction with an exemplary information processing system which includes a network processor configured in a particular manner. It should be understood, however, that the invention is more generally applicable to any processor in which it is desirable to provide more efficient processing of single-cell PDUs than is possible using the conventional techniques described above.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

The term "controller circuitry" as used herein is intended to include any portion of a processor or other type of logic or processing circuitry which is capable of performing or otherwise controlling at least a portion of a single-cell PDU processing operation.

The term "memory circuitry" as used herein is intended to include a separate memory as well as a particular portion of a larger memory, and may refer to internal memory, external memory or combinations thereof.

The terms "protocol data unit" and "PDU" as used herein are intended to include a packet, or other identifiable grouping of information.

The term "cell" as used herein is intended to include a processing unit of a switch fabric.

The term "single-cell PDU" as used herein is intended to include a PDU having a size which permits that PDU to be processed substantially in its entirety as a single cell within a switch fabric. A given single-cell PDU may therefore be substantially equivalent in size to a switch fabric cell, or smaller than a switch fabric cell.

The present invention in an illustrative embodiment is configured such that a network processor includes controller circuitry configurable to determine, for a given PDU received by the network processor, whether the given PDU is a single-cell protocol data unit. If the given PDU is a single-cell PDU, information characterizing the given PDU, such as a block descriptor, is stored in an internal memory of the network processor, without requiring any reference to or other utilization of a linked list data structure. However, if the given PDU is not a single-cell PDU, or in other words if the given PDU is a multi-cell PDU, a block descriptor or other information characterizing the given PDU is stored in a memory external to the network processor, utilizing a linked list data structure.

Figure 1:
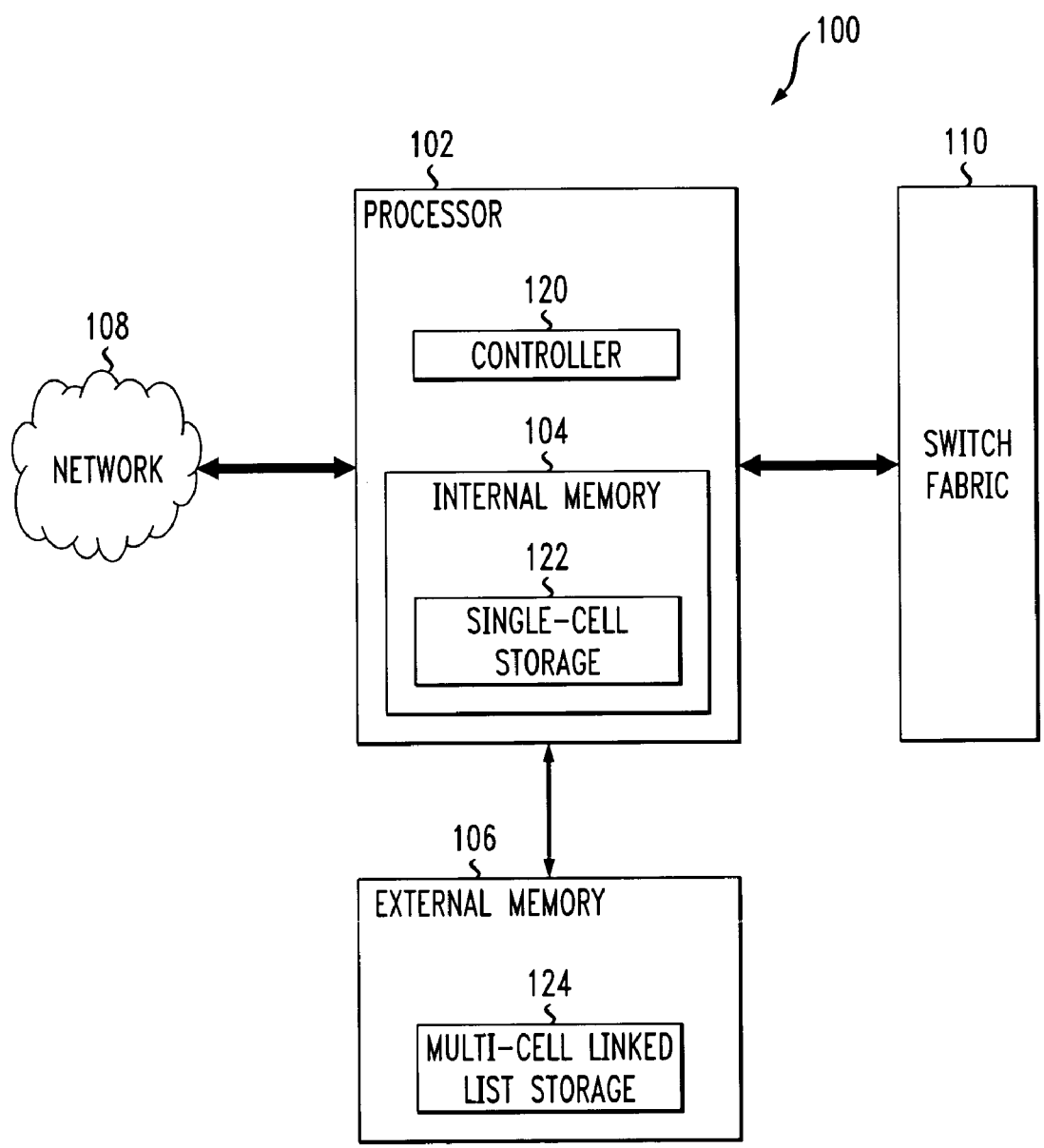
FIG. 1 is a simplified block diagram of an information processing system in which the present invention is implemented.

FIG. 1 shows an information processing system 100 in which the invention is implemented. The system 100 includes a network processor 102 having an internal memory 104. The network processor 102 is coupled to an external memory 106 as shown, and is configured to provide an interface between a network 108 from which PDUs are received and a switch fabric 110 which controls switching of PDU data. The processor 102 and its associated external memory 106 may be implemented, e.g., as one or more integrated circuits installed on a line card or port card of a router or switch. In such a configuration, the switch fabric 110 is generally considered to be a part of the router or switch.

One or both of the internal and external memories 104, 106 may be utilized to implement otherwise conventional network processor memory elements such as PDU buffer memory, queuing and dispatch buffer memory, etc.

In accordance with an aspect of the invention, the network processor 102 includes controller circuitry comprising a controller 120, and the internal memory 104 of the processor 102 includes a single-cell storage portion 122 for storing block descriptors or other information characterizing single-cell PDUs, without requiring a linked list data structure. The external memory 106 includes a multi-cell linked list storage portion 124, for storing information characterizing multi-cell PDUs, preferably utilizing a linked list data structure. The controller 120 is configurable for determining whether a given received PDU is a single-cell PDU, and for directing the storage of the associated information accordingly.

It should be understood that the particular arrangement of system elements shown in FIG. 1 is by way of illustrative example only. More particularly, as previously noted, the invention can be implemented in any type of processor, and is not limited to any particular PDU processing application. Also, the system 100 and network processor 102 may include other elements in addition to or in place of those specifically shown, including one or more elements of a type commonly found in a conventional implementation of such a system and network processor. For example, the network processor may include a classifier, a scheduler, queuing and dispatch logic, and/or other conventional elements not explicitly shown in the figure. These and other conventional elements, being well-understood by those skilled in the art, are not described in detail herein.

It is also to be appreciated that the network processor 102 as shown in FIG. 1 is considerably simplified for purposes of illustration, and in a given embodiment may include additional circuitry, such as one or more memory controllers, as well as appropriate interface circuitry for interfacing with the network 108, the switch fabric 110, and other external devices, such as an associated host processor or other device which communicates with the network processor 102 over a standard bus architecture, e.g., a peripheral component interconnect (PCI) bus.

The single-cell PDU processing functionality of the network processor 102 may be implemented at least in part in the form of software program code. For example, the controller 120 may be implemented at least in part utilizing elements that are programmable via instructions or other software that may be supplied to the network processor 102 using conventional arrangements, such as the above-noted host processor.

Figure 2:
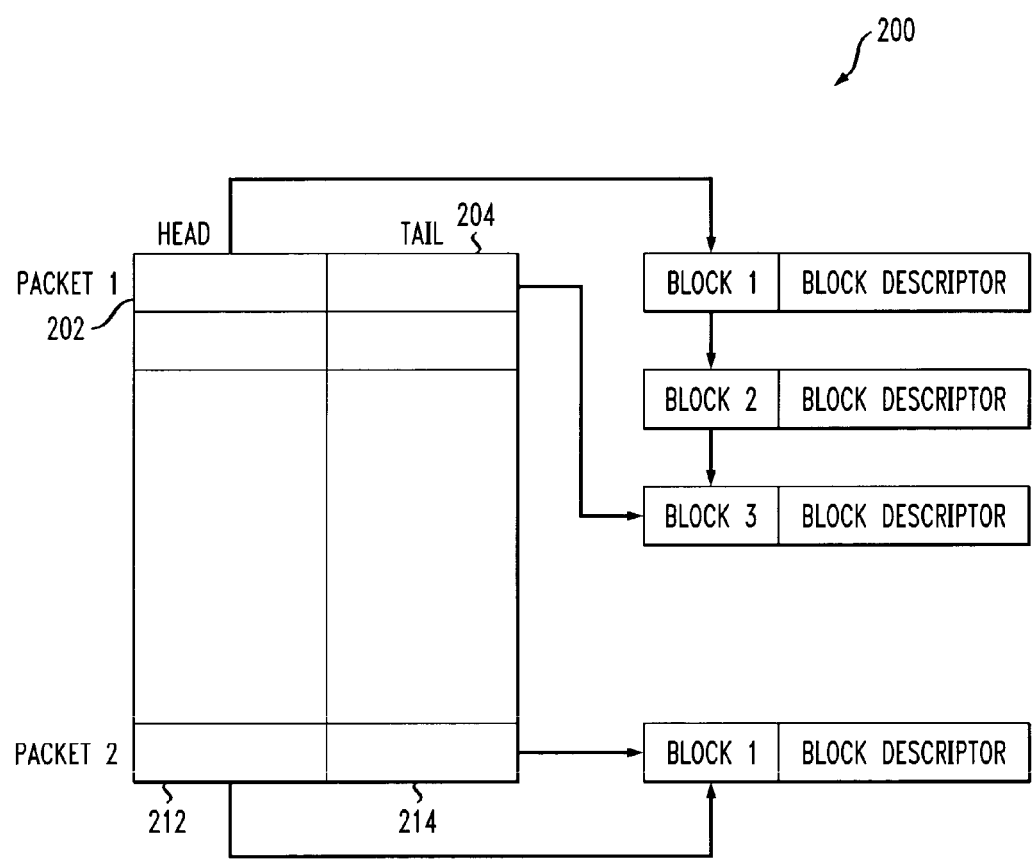
FIG. 2 shows an example linked list data structure that is utilizable for processing multi-cell PDUs in the illustrative embodiment of the invention.

FIG. 2 shows an example linked list data structure that is utilizable for storing information characterizing multi-cell PDUs in the illustrative embodiment of the invention. In this example, a linked list data structure 200 includes a set of head pointers and a set of tail pointers. As indicated, a given multi-cell packet, denoted Packet 1 in the figure, includes a head pointer 202 and a tail pointer 204. The head pointer 202 identifies in a data buffer associated with network processor 102 the particular block, denoted Block 1, that stores a first cell of the multi-cell PDU Packet 1. Similarly, the tail pointer 204 identifies in the data buffer the particular block, denoted Block 3, that stores a final cell of the PDU Packet 1. Moreover, the particular data buffer blocks of Packet 1, namely Block 1, Block 2 and Block 3, are linked in the manner shown such that the entire multi-cell PDU as stored in the data buffer is identifiable using only the head and tail pointers 202, 204. Associated with each of the blocks is a corresponding block descriptor that includes block-level information for the corresponding stored PDU data.

The blocks and block descriptors for a multi-cell PDU may be configured and processed in a conventional manner, as will be appreciated by those skilled in the art. Their configuration and processing will therefore not be described in further detail herein.

Of course, this particular linked list data structure is presented by way of illustrative example only, and numerous other data structures may be used in implementing the invention.

For purposes of providing further illustration of the operation of the particular linked list data structure of FIG. 2, a single-cell PDU denoted Packet 2 is also shown in the figure. Application of the linked list data structure to this single-cell PDU results in a head pointer 212 and a tail pointer 214, both of which identify the same data block, denoted Block 1. Also, there is a single block descriptor associated with this data block.

As indicated previously, the present invention in the illustrative embodiment does not utilize a linked list data structure such as that of FIG. 2 in processing single-cell PDUs. Instead, the illustrative embodiment utilizes the linked list data structure of FIG. 2 only for processing multi-cell PDUs, with the single-cell PDUs being identified as such and handled in a manner which avoids the large number of memory accesses associated with maintenance of a linked list data structure. By way of contrast, the conventional techniques previously described herein generally utilize a given linked list approach for both multi-cell and single-cell PDUs, leading to numerous inefficiencies and associated performance limitations.

Figure 3:
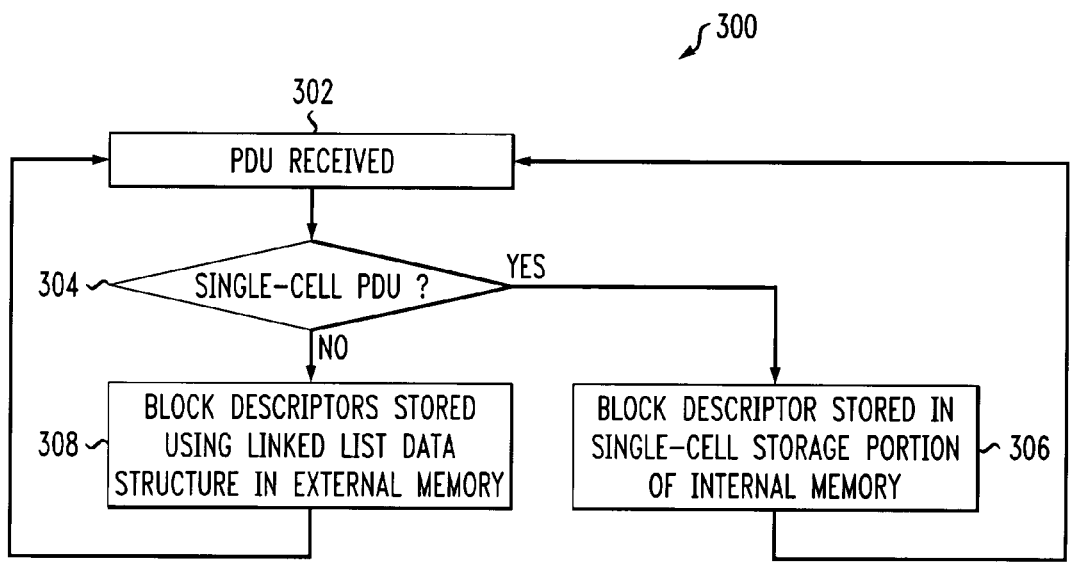
FIG. 3 is a flow diagram of PDU processing operations implemented in the FIG. 1 system in accordance with the techniques of the invention.

FIG. 3 is a flow diagram 300 which illustrates PDU processing operations implemented in the network processor 102 in accordance with the invention.

In step 302, a given PDU is received in the network processor 102 from, for example, the network 108.

In step 304, a determination is made as to whether the received PDU is a single-cell PDU. This determination may be made by configuring the controller 120 to identify single-cell PDUs. Other types of controller circuitry, including circuitry executing software program code, may also be used.

If the received PDU is a single-cell PDU, a block descriptor or other information characterizing the single-cell PDU is stored in the single-cell storage portion 122 of the internal memory 104 of the network processor 102. In this single-cell storage portion 122 of the internal memory 104, a linked list data structure such as that shown in FIG. 2 is not required, and is preferably not utilized.

If the received PDU is not a single-cell PDU, block descriptors or other information characterizing the multi-cell PDU are stored in the multi-cell linked list storage portion 124 of the external memory 106. A linked list data structure such as that described in conjunction with FIG. 2 is utilized to store the block descriptors for the multi-cell PDU.

The steps of the FIG. 3 process may be repeated sequentially for each PDU to be processed, as indicated in the figure, or alternatively the PDUs may be processed in groups of multiple PDUs at each of the steps, followed by repeating of the steps for other groups of multiple PDUs. The particular steps shown in FIG. 3 should be considered as examples of PDU processing operations in accordance with the illustrative embodiment of FIGS. 1 and 2, rather than as limiting the scope of the invention in any way.

Figure 4:
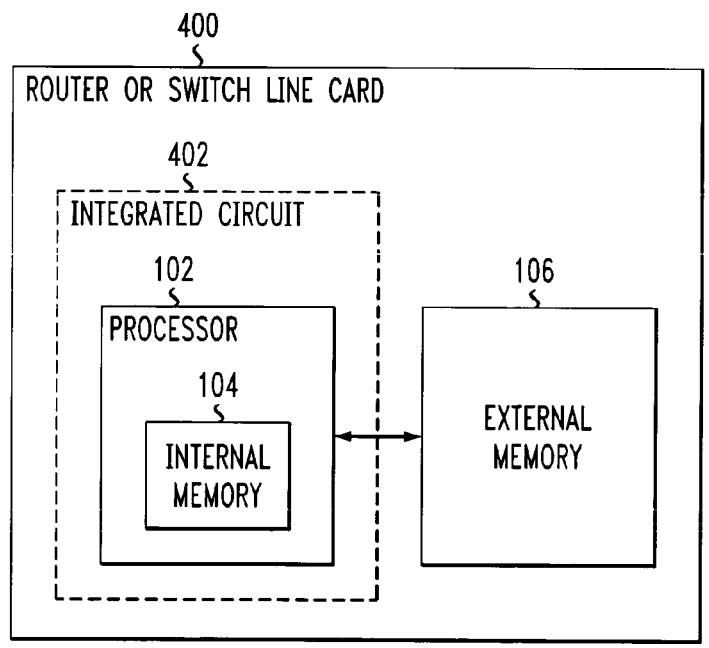
FIG. 4 illustrates one possible implementation of a network processor of the FIG. 1 system as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The external memory 106 may serve, e.g., as an external tree memory for the network processor integrated circuit. The above-noted host processor may also be installed on the line card 400. The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

The above-described embodiments of the invention are intended to be illustrative only. For example, although the illustrative embodiment of FIG. 1 utilizes controller 120 in implementing distinct processing operations for single-cell PDUs, other embodiments may utilize different types of controller circuitry for implementing such operations. In addition, other embodiments can use different types of internal or external memory circuitry configurations for implementing the described functionality. Furthermore, the use of block descriptors as characterizing information for the data blocks of single-cell and multi-cell PDUs is purely by way of example, and other types of characterizing information may be used. As mentioned previously, the invention can utilize linked list data structures or other data structures different than those specifically described herein for storage of block descriptors or other characterizing information for multi-cell PDUs. These and numerous other alternative embodiments within the scope of the following claims will be apparent to those skilled in the art.

What is claimed is:

1. A processor comprising:
   controller circuitry configurable to determine for a given protocol data unit received by the processor whether the given protocol data unit is a single-cell protocol data unit; and
   first memory circuitry internal to the processor;
   the processor being connectable to second memory circuitry external to the processor;
   wherein, if the given protocol information characterizing the given protocol data unit is a single-cell protocol data unit is stored in the first memory circuitry; and
   wherein if the given protocol information characterizing the given protocol data unit is not a single-cell protocol data unit is stored in the second memory circuitry
   wherein the information characterizing the given protocol data unit comprises at least one block descriptor; and
   wherein the block descriptor is associated with a particular data block of the given protocol data unit.

2. The processor of claim 1 wherein the protocol data unit comprises a packet.

3. The processor of claim 1 wherein the single-cell protocol data unit comprises a protocol data unit having a size less than or substantially equal to that of a cell-based processing unit of a switch fabric associated with the processor.

4. The processor of claim 1 wherein the information characterizing the given protocol data unit is stored in the first memory circuitry without requiring utilization of a linked list data structure.

5. The processor of claim 1 wherein the information characterizing the given protocol data unit is stored in the second memory circuitry utilizing a linked list data structure.

6. The processor of claim 1 wherein the processor is configured to provide an interface for communication of the protocol data unit between a network and a switch fabric.

7. The processor of claim 1 wherein at least one of the first memory circuit and the second memory circuitry further comprises a queuing and dispatch buffer memory of the processor.

8. The processor of claim 1 wherein at least one of the first memory circuitry and the second memory circuitry further comprises a PDU buffer memory of the processor.

9. The processor of claim 1 wherein the processor comprises a network processor.

10. The processor of claim 1 wherein the processor is configured as an integrated circuit.

11. A method for use in a processor comprising controller circuitry and first memory circuitry internal to the processor, the processor being connectable to second memory circuitry external to the processor, the method comprising the steps of:
   determining for a given protocol data unit received by the processor whether the given protocol data unit is a single-cell protocol data unit;
   if the given protocol data unit is a single-cell protocol data unit, storing information characterizing the given protocol data unit in the first memory circuitry; and
   if the given protocol data unit is not a single-cell protocol data unit, storing information characterizing the given protocol data unit in the second memory circuitry wherein the information characterizing the given protocol data unit comprises at least one block descriptor; and
wherein the block descriptor is associated with a particular data block of the given protocol data unit.

12. A processor-readable medium containing processor-executable instructions for use in a processor comprising controller circuitry and first memory circuitry internal to the processor, the processor being connectable to second memory circuitry external to the processor, the instructions when executed in the processor implementing the steps of:

determining for a given protocol data unit received by the processor whether the given protocol data unit is a single-cell protocol data unit;

if the given protocol data unit is a single-cell protocol data unit, storing information characterizing the given protocol data unit in the first memory circuitry; and if the given protocol data unit is not a single-cell protocol data unit, storing information characterizing the given protocol data unit in the second memory circuitry wherein the information characterizing the given protocol data unit comprises at least one block descriptor; and wherein the block descriptor is associated with a particular data block of the given protocol data unit.

* * * * *

UNITED STATES PATENT AND TRADEMARK OFFICE
CERTIFICATE OF CORRECTION

PATENT NO. : 7,590,056 B2
APPLICATION NO. : 10/630961
DATED : September 15, 2009
INVENTOR(S) : R. A. Corley et al.

It is certified that error appears in the above-identified patent and that said Letters Patent is hereby corrected as shown below:

In the claims:

Column 6, line 18, after "protocol" insert --data unit is a single-cell protocol data unit,--

Column 6, lines 19-20, delete "is a single-cell protocol data unit"

Column 6, line 21, after "protocol" insert --data unit is not a single-cell protocol data unit,--

Column 6, lines 22-23, delete "is not a single-cell protocol data unit"

Column 6, line 23, after "circuitry" insert --;--

Column 6, line 67, after "circuitry" insert --;--

Column 8, line 6, after "circuitry" insert --;--

Signed and Sealed this

Twenty-seventh Day of October, 2009

David J. Kappos
*Director of the United States Patent and Trademark Office*